United States Patent
Elfert et al.

(10) Patent No.: US 11,226,004 B2
(45) Date of Patent: Jan. 18, 2022

(54) ROLLING ELEMENT FOR USE IN A ROLLING-ELEMENT BEARING

(71) Applicants: THYSSENKRUPP ROTHE ERDE GMBH, Dortmund (DE); thyssenkrupp AG, Essen (DE)

(72) Inventors: Gunther Elfert, Erwitte (DE); Bernd Lueneburg, Mülheim (DE); Joerg Rollmann, Lippstadt (DE); Manfred Reimann, Schloß Holte-Stukenbrock (DE)

(73) Assignees: THYSSENKRUPP ROTHE ERDE GMBH, Dortmund (DE); THYSSENKRUPP AG, Essen (DE)

( * ) Notice: Subject to any disclaimer, the term of this patent is extended or adjusted under 35 U.S.C. 154(b) by 440 days.

(21) Appl. No.: 16/328,335

(22) PCT Filed: Aug. 24, 2017

(86) PCT No.: PCT/EP2017/071301
§ 371 (c)(1),
(2) Date: Feb. 26, 2019

(87) PCT Pub. No.: WO2018/041704
PCT Pub. Date: Mar. 8, 2018

(65) Prior Publication Data
US 2021/0277954 A1    Sep. 9, 2021

(30) Foreign Application Priority Data
Aug. 30, 2016 (DE) .................... 10 2016 116 118.7

(51) Int. Cl.
  *F16C 41/00* (2006.01)
  *F16C 33/34* (2006.01)
  *F16C 19/36* (2006.01)

(52) U.S. Cl.
  CPC .............. *F16C 41/00* (2013.01); *F16C 19/36* (2013.01); *F16C 33/34* (2013.01); *F16C 2233/00* (2013.01)

(58) Field of Classification Search
  CPC .......... F16C 19/36; F16C 33/34; F16C 41/00; F16C 41/004; F16C 41/008; F16C 2360/31; G01L 5/0028–0042; G01D 5/24
  See application file for complete search history.

(56) References Cited

U.S. PATENT DOCUMENTS

| 4,175,430 A | 11/1979 | Beale |
| 5,503,030 A * | 4/1996 | Bankestrom ......... F16C 41/008 73/862.627 |

(Continued)

FOREIGN PATENT DOCUMENTS

| CN | 102192804 A | 9/2011 |
| CN | 102410308 A | 4/2012 |

(Continued)

OTHER PUBLICATIONS

Machine Translation of EP-908714-A1 (Year: 1999).*
English Translation of International Search Report issued in PCT/EP2017/071301, dated Nov. 15, 2017.

*Primary Examiner* — Alan B Waits
(74) *Attorney, Agent, or Firm* — thyssenkrupp North America, LLC

(57) ABSTRACT

A rolling element for use in a rolling-element bearing is proposed, including an outer casing and a bore hole. The bore hole is provided along a center line of the rolling element. The rolling element has at least one sensor arranged in the bore hole for load measurement and a radio module for transmitting the data measured by the sensor, wherein the rolling element has a micro-generator to provide the energy required for operation of the sensor and/or of the radio module.

15 Claims, 6 Drawing Sheets

(56) References Cited

U.S. PATENT DOCUMENTS

| | | | |
|---|---|---|---|
| 8,961,021 B2 * | 2/2015 | Stubenrauch | F16C 33/366 |
| | | | 384/448 |
| 2011/0182536 A1 | 7/2011 | Matsuda | |
| 2012/0020603 A1 | 1/2012 | Stubenrauch | |
| 2014/0157880 A1 | 6/2014 | Matsuda | |
| 2015/0036956 A1 * | 2/2015 | Ito | F16C 19/02 |
| | | | 384/446 |
| 2016/0169288 A1 | 6/2016 | Leimann | |
| 2017/0059448 A1 * | 3/2017 | Meaney | F16C 41/008 |
| 2018/0003492 A1 * | 1/2018 | van der Ham | F16C 33/34 |

FOREIGN PATENT DOCUMENTS

| | | |
|---|---|---|
| CN | 105452693 A | 3/2016 |
| DE | 698 28 236 T | 12/2005 |
| DE | 10 2007 009 093 A | 8/2008 |
| DE | 10 2010 038 393 A | 1/2012 |
| DE | 10 2012 200 778 A | 7/2013 |
| DE | 10 2012 200 783 A | 7/2013 |
| DE | 10 2013 214 703 A | 1/2015 |
| DE | 11 2013 007 412 T | 6/2016 |
| DE | 11 2013 007 416 T | 6/2016 |
| EP | 0 637 734 B | 8/1998 |
| EP | 0908714 A1 * | 4/1999 ............. F16C 33/46 |
| EP | 1 795 869 A | 6/2007 |
| EP | 2 354 578 A | 8/2011 |
| EP | 1 849 013 B | 11/2011 |
| WO | 2007/067045 A | 6/2007 |
| WO | WO-2015032449 A1 * | 3/2015 ............ F16C 41/004 |

* cited by examiner

ROLLING ELEMENT FOR USE IN A ROLLING-ELEMENT BEARING

CROSS REFERENCE TO RELATED APPLICATIONS

This application is a U.S. National Stage Entry of International Patent Application Serial Number PCT/EP2017/071301, filed Aug. 24, 2017, which claims priority to German Patent Application No. DE 10 2016 116 118.7, filed Aug. 30, 2016, the entire contents of both of which are incorporated herein by reference.

FIELD

The present disclosure generally relates to large rolling-element bearings, such as ones found in wind turbines.

BACKGROUND

During operation, considerable forces act on large rolling-element bearings, such as used for example in wind turbines. It is therefore desirable to be able to carry out load measurements on the rolling-element bearing.

For this purpose, it is known for example from EP 0 637 734 B1, by means of strain gages which are arranged in a bore hole in a rolling element, to measure the deformations of the rolling element, the forces acting on the rolling-element bearing, that is to say the loads, being able to be extrapolated from the deformations of the rolling element. In order to supply energy to the strain gages and an amplifier which is connected thereto as well as a transmitter, a first coil is further arranged in the rolling element, which coil is supplied with energy inductively by a second coil which is arranged on a non-rotatable bearing ring of the rolling-element bearing.

To supply energy to the second coil, complex wiring which disrupts operation is required. Furthermore, the strain gages and the respective attachments thereof, generally bondings, are susceptible to wear, in particular since said gages generally come into contact with grease and/or other lubricants in the rolling-element bearings and must therefore be replaced regularly. Therefore, such a load measurement is possible only under laboratory conditions.

Furthermore, it is known from EP 1 849 013 B1 to arrange sensors on a cage which fixes the rolling elements in the positions thereof relative to one another, the sensors measuring eddy currents which are induced in the rolling elements by coils. The prevailing loads can then be extrapolated from the eddy current measurements. In this case as well, energy is supplied inductively by an energy transmission coil arranged in the outer ring. This again results in the disadvantages already discussed.

Alternatively, EP 1 795 869 A1 discloses a rolling element, comprising a bore hole in which two boards are arranged parallel to and at a distance from one another, an electrode being attached to the boards opposite in each case, which electrodes capacitively measure the distance of the boards from one another. This distance is variable, since the boards bend as a result of the load-induced deformation of the rolling element. This measurement is restricted to a region of the rolling element and is likewise susceptible to wear as a result of the bending of the circuit boards. An external energy supply is also disclosed again, which is disadvantageous, since it necessitates wiring of the rolling-element bearing. In addition, the boards can shift relative to one another, which leads to measurement inaccuracies.

Thus a need exists for a rolling-element and a rolling-element bearing, by means of which reliable, continuous and long-term load measurement is possible even during ongoing operation, in particular without wiring of the rolling-element bearing being necessary.

DETAILED DESCRIPTION

Figure 1:
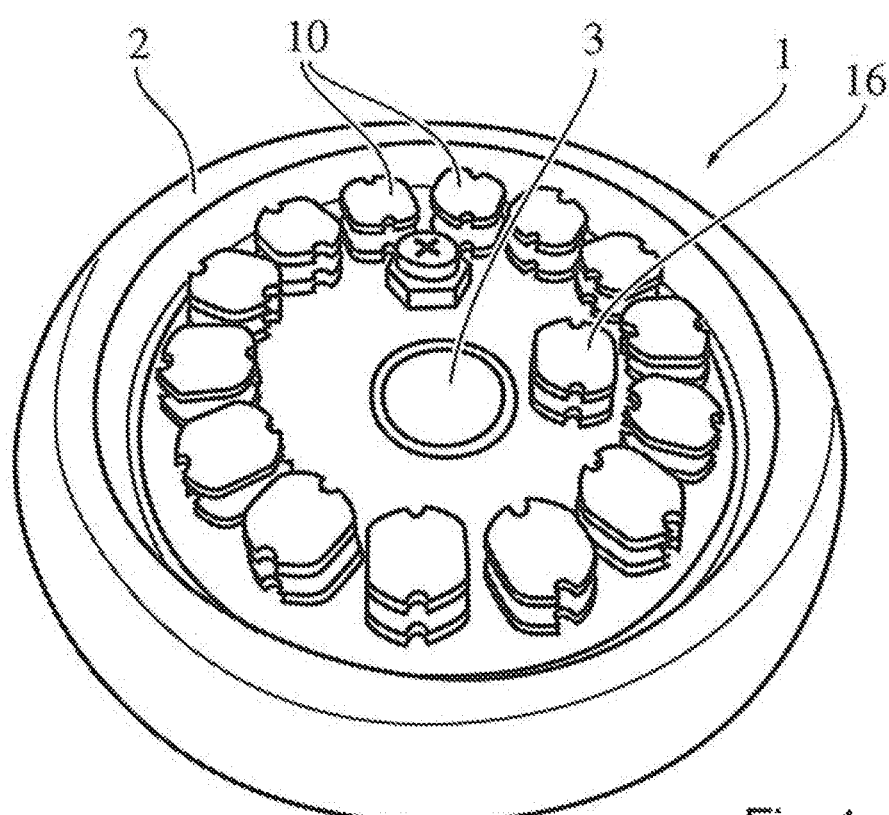
FIG. 1 is a schematic perspective view of a rolling element according to the disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a rolling element for use in a rolling-element bearing, comprising an outer casing and a bore hole, the bore hole being provided along a centerline of the rolling element, the rolling element having at least one sensor arranged in the bore hole for load measurement and a radio module for transmitting the data measured by the sensor, wherein the rolling element has a micro-generator, the micro-generator being provided to provide the energy required for operation of the sensor and/or of the radio module. Preferably, the outer casing is provided at least in part as a running surface on which bearing rings, in particular an outer ring and an inner ring, of the rolling-element bearing roll. In this case, one of the bearing rings, in particular the outer ring, is preferably provided in a rotationally fixed manner, whereas the other bearing ring is provided concentrically therewith and so as to be rotatable.

Preferably, the rolling element is cylindrical, barrel-shaped, toroidal and/or conical. In this case, the rolling element has a main extension direction, the centerline being arranged parallel to the main extension direction. Particularly preferably, the rolling element is provided substantially rotationally symmetrically around the centerline, in particular in the region between the bore wall and the outer casing. The outer casing corresponds in particular to an outer lateral surface of the rolling element. For example, the rolling element is in the form of a cylinder having a length of 104 mm and a diameter of 65 mm. In this case, the bore hole preferably has a diameter of 20 mm. Preferably, the radio module and/or the micro-generator are also arranged at least in part in the bore hole. In the context of this application, a micro-generator is in particular a device having small dimensions which obtains energy from the environment and thus represents an autonomous energy source. Particularly preferably, the micro-generator is used at least for a process of what is known as energy harvesting. Very particularly preferably, the micro-generator energy is obtained from a temperature difference, an air pressure difference, an airflow, by means of photovoltaics, and/or, in the context of this application particularly preferably from movement. The micro-generator is thus provided in particular to obtain energy from the rolling or rotational movement of the rolling element, which energy said micro-generator then provides for the operation of the sensor and/or of the radio module.

The rolling element according to the invention has the advantage over the prior art that the rolling element has an integrated and autonomous energy supply and transmits the data wirelessly by means of the radio module so that no wiring of the rolling element or of one of the bearing rings and thus of the rolling-element bearing is necessary. Furthermore, the rolling element according to the invention provides precise load measurements and allows this in particular even during the ongoing operation of a rolling-element bearing equipped with the rolling element according to the invention.

Advantageous configurations and developments of the invention can be found in the dependent claims and the description with reference to the drawings.

According to one preferred embodiment of the present invention, it is provided that the sensor is a capacitive sensor, the sensor being provided to measure a distance between the sensor and the bore wall. The rolling element is deformed according to the forces acting on the rolling-element bearing and thus on the rolling element, and this can be measured on the basis of a change in the cross section of the bore hole. Particularly preferably, the sensor is configured to transmit the measured data to the radio module, the radio module being configured to transmit the measured data, for example to a suitable receiver terminal. Very particularly preferably, the capacitive sensor has a dielectric medium. Even more preferably, the bore wall has an at least partially electrically conductive material at least in part. For example, the rolling element is produced from an electrically conductive material and/or has an electrically conductive coating on the bore wall. As an electrically conductive material, in particular a metal material is considered. As a result, in an advantageous manner, a precise and simple load measurement is made possible.

According to another preferred embodiment, it is provided that, in the bore hole, at least two sensors which are at a distance from one another along the centerline are arranged. As a result, in an advantageous manner, it is made possible to also measure a tipping of the rolling element in addition to the forces by evaluating, in particular comparing, the measured data of the sensors.

According to another preferred embodiment, it is provided that, in the axial direction, at the level of the sensor, particularly preferably opposite said sensor with respect to the centerline, a means for producing a defined distance from the bore wall is provided, the means having in particular a magnet and/or a spring means. Very particularly preferably, the means is a rolling contact block, the rolling contact block comprising a magnet, by which said block is pulled onto the bore wall, in particular in such a way that the rolling contact block bears against the bore wall at least in part. As a result, in an advantageous manner, the precision of the load measurement is further increased, since it is ensured that the sensor can measure the entire deformation of the rolling element as a distance. Preferably, the distance between the sensor and the bore wall is at least 50 μm and at most 150 μm. Particularly preferably, the distance between the sensor and the bore wall in a load-free state is 100 μm when the means bears against the bore wall. Preferably, the capacitive sensor is electrically coupled to the means by a resonant circuit. Particularly preferably, the resonant circuit is produced by coils arranged between the bore hole and the outer casing, in particular on a circular path and/or at a uniform distance. As a result, it is advantageously made possible for a frequency at which the system oscillates to be measured, which frequency in turn is related to the amount of the deformation and thus the load. A resonant circuit system of this type is advantageously insensitive to disruptions.

According to another preferred embodiment, it is provided that, in the bore hole, a circuit board is arranged, the radio module, the micro-generator, the capacitive sensor and/or the means being attached to the circuit board. Particularly preferably, the circuit board has a thickness of from 1 mm to 2 mm, in particular 1.6 mm. As a result, in an advantageous manner, a simple installation of the individual components in the rolling element is made possible.

According to another preferred embodiment, it is provided that the rolling element further has an energy accumulator, the energy accumulator being provided to store the energy generated by the micro-generator. Particularly preferably, the energy accumulator is provided on the circuit board. Very particularly preferably, the energy accumulator is a storage battery and/or a capacitor, in particular a high-capacitance capacitor, e.g. what is known as a green-cap capacitor.

According to another preferred embodiment, it is provided that the radio module is provided to transmit the measured data in a frequency range of from 100 MHz to 6 GHz, preferably from 300 MHz to 2 GHz, particularly preferably from 700 MHz to 1 GHz, in particular at a frequency of 833 MHz. As a result, in an advantageous manner, a wireless data transmission is made possible, which is also not disrupted by optionally metal components of the rolling element or of the rolling-element bearing and comprises a sufficiently large transmission range.

According to another preferred embodiment, it is provided that the bore hole comprises a diameter of from 5 mm to 50 mm, preferably from 10 mm to 30 mm, in particular a diameter of 20 mm, and/or that the rolling element is preferably cylindrical and particularly preferably comprises a length of from 90 mm to 110 mm, in particular 104 mm, and very particularly preferably a diameter of from 60 mm to 70 mm, in particular 65 mm. As a result, firstly, a sufficiently large bore hole for accommodating all the components is provided, secondly, in the case of a bore hole having the above-mentioned dimensions, the deformation clearance which is available is large enough for a precise measurement, in particular without impairing the structural stability of the rolling element.

According to another preferred embodiment, it is provided that, on the bore wall, in particular in the radial direction, a strain gage is arranged in an at least partially circumferential manner. As a result, it is advantageously possible, in addition to the precise capacitive measurement, to implement a redundant and proven measuring method with little complexity.

According to another preferred embodiment, it is provided that the micro-generator is an inductive generator, or that the rolling element comprises an inductive generator. Particularly preferably, the inductive generator cooperates with magnets and/or coils which are arranged on a cage of a rolling-element bearing. As a result, in a particularly advantageous manner, it is possible to provide an autonomous energy supply, which in particular also provides energy only when it is required, namely during a rotation of the rolling element. In the case where the rolling element comprises an inductive generator in addition to the micro-generator, it is advantageously possible to provide a redundant power supply in case of a disruption or a failure of the micro-generator. In particular in combination with magnets, in this case, advantageously no wiring of the rolling-element bearing is necessary.

According to another preferred embodiment, it is provided that the rolling element has a means for determining position. Particularly preferably, the means is at least one magnet, in particular a diametral magnet. Said magnet very particularly preferably cooperates with a detection means for determining the position of the rolling element, the rolling element having the detection means, in particular the inner ring, the outer ring and/or the cage. As a result, in a particularly advantageous manner, it is possible to determine the absolute and/or relative position of the rolling element in the rolling-element bearing.

The present invention further relates to a rolling-element bearing, in particular a large rolling-element bearing, comprising a first bearing ring and a second bearing ring which is rotatable about an axis of rotation and in particular is arranged concentrically with the first bearing ring, and a plurality of rolling elements arranged between the first bearing ring and the second bearing ring, wherein at least one rolling element is a rolling element according to the invention. Preferably, the first bearing ring is an outer ring, and/or the second bearing ring is an inner ring. As a result, it is advantageously possible to provide a rolling-element bearing which, without additional installation complexity, allows an, in particular continuous, wireless load measurement.

According to a preferred embodiment, it is provided that the rolling-element bearing has a detection means for determining the position of the rolling element. Particularly preferably, the detection means cooperates with a means for determining the position of the rolling element, the rolling element having the means for determining position. Very particularly preferably, it is provided that the inner ring, the outer ring and/or the cage comprise the detection means. As a result, in a particularly advantageous manner, it is possible to determine the absolute and/or relative position of the rolling element in the rolling-element bearing.

Further details, features and advantages of the invention can be found in the drawings and in the following description of preferred embodiments with reference to the drawings. In this case, the drawings illustrate merely exemplary embodiments of the invention which do not limit the essential inventive concepts.

FIG. 1 is a schematic perspective view of a rolling element 1 according to an exemplary embodiment of the present invention. A rolling element 1 of this type is used in rolling-element bearings and is used to movably guide a first bearing ring 11 and a second bearing ring 12 relative to one another, in particular an inner ring 12 arranged in an outer ring 11 which is arranged in a rotationally fixed manner. In this case, a plurality of rolling elements are conventionally provided between the outer ring 11 and the inner ring 12, which elements roll on running surfaces of the outer ring 11 and the inner ring 12. The present case relates to what is known as a measuring roller, that is to say a rolling element 1, which is provided and designed for measuring loads in the rolling-element bearing.

In this case, the rolling element 1 comprises a cylindrical or substantially conical body having an outer casing 2 which is used as a running surface and on which the outer ring 11 and the inner ring 12 roll. The rolling element 1 has a bore hole 3 in the center thereof which is formed concentrically around the centerline of the rolling element 1. A plurality of coils 10, which in this case are arranged on a circular path between the bore hole 3 and the outer casing 2, can additionally be seen. In this case, there are fourteen coils 10, which are each arranged so as to be offset by approx. 25°, a magnetic field which is directed in the opposite direction in each case being generated by applying a current or a voltage. A resonant circuit is produced by applying an alternating voltage. Said circuit will be described in greater detail in connection with the following drawings.

Furthermore, the rolling element 1 comprises a means for determining position 16, in this case a diametral magnet, which cooperates with a detection means to determine the absolute and/or relative position of the rolling element 1 in the rolling-element bearing. In this case, for example, the cage 13 comprises the detection means. In this case, the relative position is the position of the rolling element 1 relative to the cage 13, in particular relative to a reference point.

Figure 2:
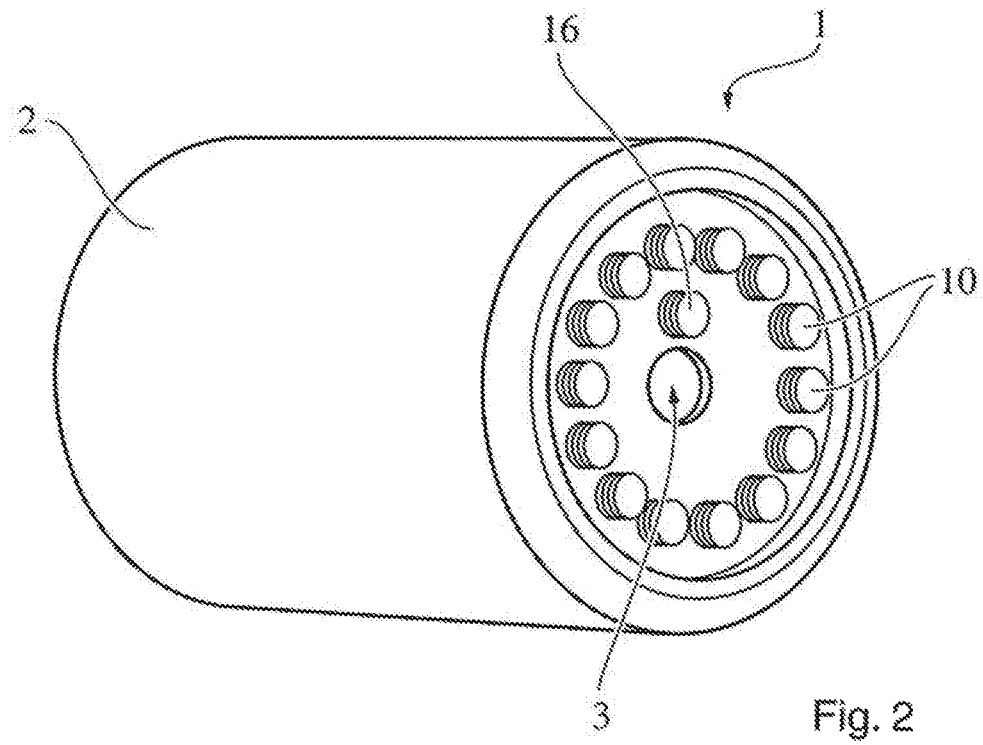
FIG. 2 is another schematic perspective view of a rolling element according to the disclosure.

FIG. 2 is another schematic perspective view of a rolling element 1 according to an exemplary embodiment of the present invention. In this case, the embodiment shown substantially corresponds to the embodiment shown in FIG. 1, and therefore reference is made generally to the comments in this regard. It can clearly be seen here that the rolling element 1 is substantially cylindrical. In the bore hole 3, a measuring arrangement which is to be explained in greater detail in the following is provided.

Figure 3:
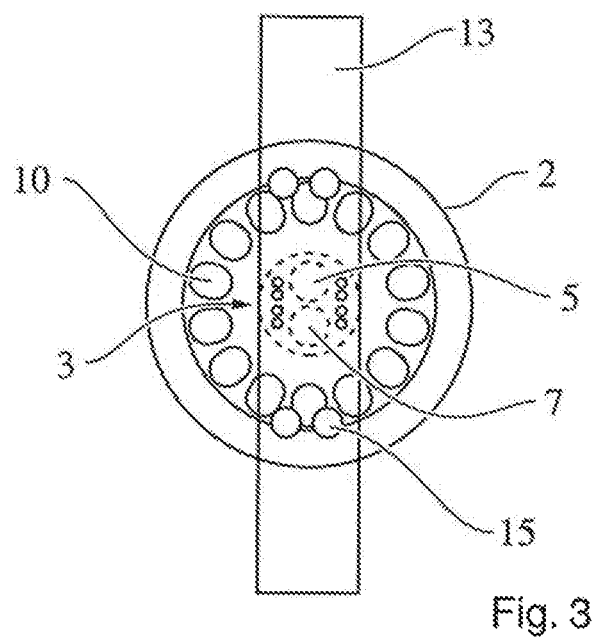
FIG. 3 is a schematic sectional view perpendicular to the centerline of a rolling element according to the disclosure comprising a cage of a rolling-element bearing.

FIG. 3 is a schematic sectional view perpendicular to the centerline of a rolling element 1 according to an exemplary embodiment of the present invention comprising a cage 13 of a rolling-element bearing. In this case, the embodiment shown substantially corresponds to the embodiments shown in the previous drawings, and therefore reference is made generally to the comments in this regard. In the bore hole, a sensor 5, in this case a capacitive sensor 5, a radio module 6 and a micro-generator 4 are provided. In this case, the micro-generator is an inductive micro-generator. So that the rolling elements of a rolling-element bearing remain at a regular distance for a uniform load distribution, a cage 13 is arranged between the outer ring 11 and the inner ring 12, which cage comprises the rolling elements. This means that the rolling elements are rotatable but are mounted in fixed positions with respect to the cage 13. At the point of the rolling element 1, the cage 13 has magnets 15, in this case four magnets 5. Said magnets 15 make it possible to induce a current in the micro-generator 4 and thus provide an energy supply for the sensor 5 and the radio module 6 as well as the coils 10. Alternatively or additionally, and in the context of the present invention preferably, the micro-generator is provided in such a way that said micro-generator generates energy solely from the movement, i.e. the rolling, of the rolling element.

The sensor 5 is arranged on a circuit board 8 (not shown here). On the other side of the circuit board 8, i.e. opposite the sensor 5 with respect to the centerline, a means 7 is arranged for producing a defined distance from the bore wall. In this case, said means 7 is a rolling contact block having a magnet 14 arranged therein. The magnet ensures that the rolling contact block comes into contact with the bore wall, since it is attracted alternately by the magnetic fields of the coils 10. As a result, the means 7 comprising the circuit board 8 and thus also the sensor 5 performs an oscillation, the frequency of which depends firstly on the coils 10 and secondly on the distance between the means 7 and the bore wall or the distance between the sensor 5 and the bore wall, and of course on the properties of the rolling contact block, e.g. the mass thereof and the strength of the magnet 14. The capacitive sensor 5 thus measures a frequency that corresponds to a distance from the bore wall. If the rolling element 1 is then deformed by forces, i.e. loads, acting on the rolling element 1, then the bore hole 3 deforms as well. The distance between the capacitive sensor 5 and the bore wall thus changes, and the measured frequency also changes together therewith. The measured frequency is transmitted to the radio module 6, which transmits said frequency wirelessly from the rolling element. It is also conceivable for a deformation or load to be determined from the measured data beforehand, which deformation or load is then transmitted.

Figure 4:
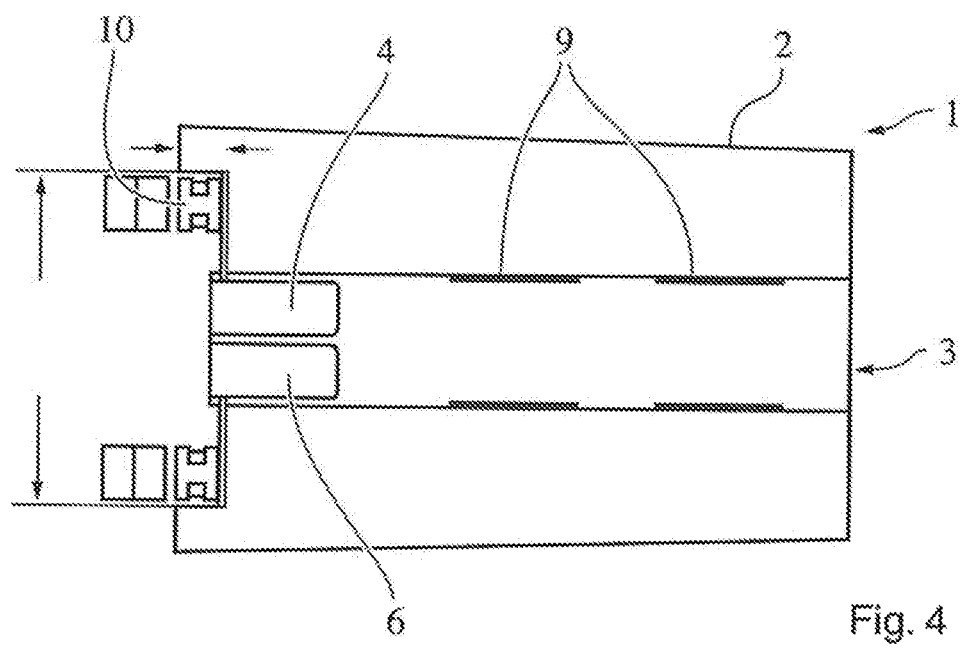
FIG. 4 is a schematic sectional view parallel to the centerline of a rolling element according to the disclosure.

FIG. 4 is a schematic sectional view parallel to the centerline of a rolling element 1 according to an exemplary embodiment of the present invention. In this case, the embodiment shown substantially corresponds to the embodiment shown in FIG. 3, and therefore reference is made generally to the comments in this regard. In particular the bore hole 3 can be seen here, and the micro-generator 4 and the radio module 6 are shown schematically.

Figure 5:
FIG. 5 is a schematic equivalent circuit diagram of the coils from FIGS. 3 and 4 according to the disclosure.

FIG. 5 is a schematic equivalent circuit diagram of the coils 10 from FIGS. 3 and 4 according to an exemplary embodiment of the present invention. In this case, the coils 10 represent resistors which are connected in series. According to the drawings described previously, fourteen coils 10, accordingly fourteen resistors, are provided in this case.

Figure 6:
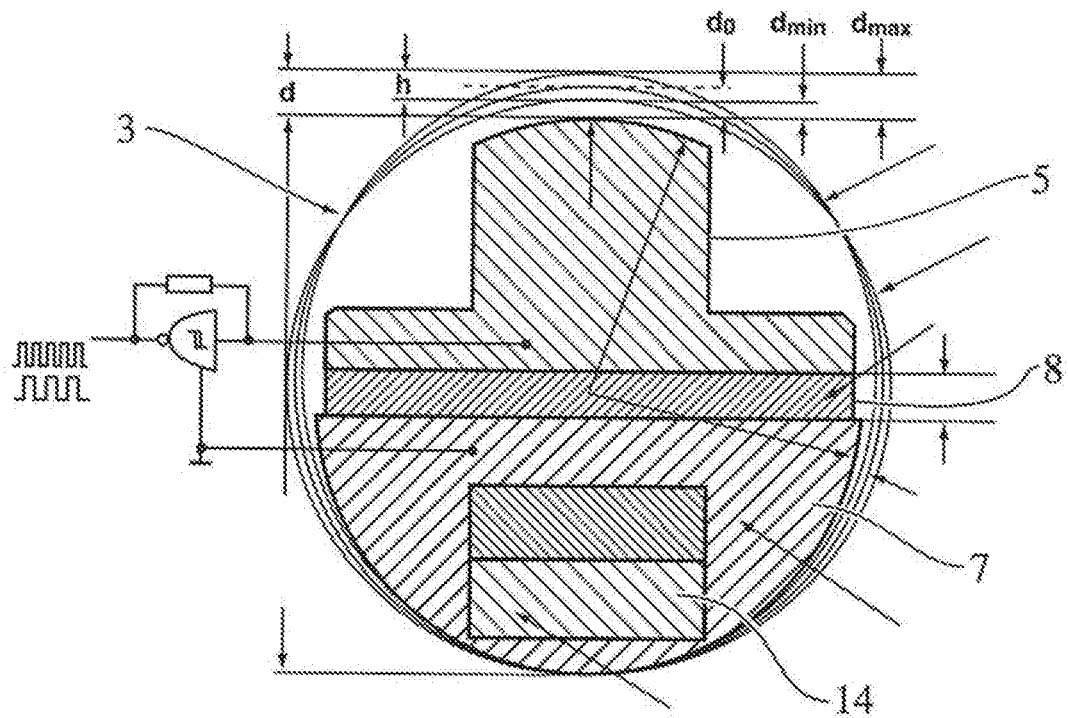
FIG. 6 is a schematic cross-sectional view of a bore hole of a rolling element according to the disclosure.

FIG. 6 is a schematic cross section of a bore hole 3 of a rolling element 1 according to an exemplary embodiment of the present invention. The circuit board 8 can be seen clearly here, the capacitive sensor 5 being arranged on one side of the circuit board 8, and the means 7 comprising the magnet 14 being arranged on the other side. In addition, various deformations or distances d are drawn in. In the embodiment shown, the distance $d_0$ between the capacitive sensor 5 and the bore wall in a load-free state is approx. 100 μm, the magnet 14 of the means 7 having brought the rolling contact block into contact with the bore wall. Depending on whether the bore hole is distorted or compressed, the distance, that is to say the deformation, changes between a minimum value $d_{min}$ of 50 μm and a maximum value $d_{max}$ of 150 μm. On the left-hand side of the drawing, a resonant circuit is shown schematically. In this regard, reference is made to the comments regarding FIG. 4. In this case, the capacitive sensor 5 and the rolling contact block have, at least in part, an outer contour which follows the contour of the bore wall in a load-free state, that is to say which is concentric with the bore wall.

Figure 7:
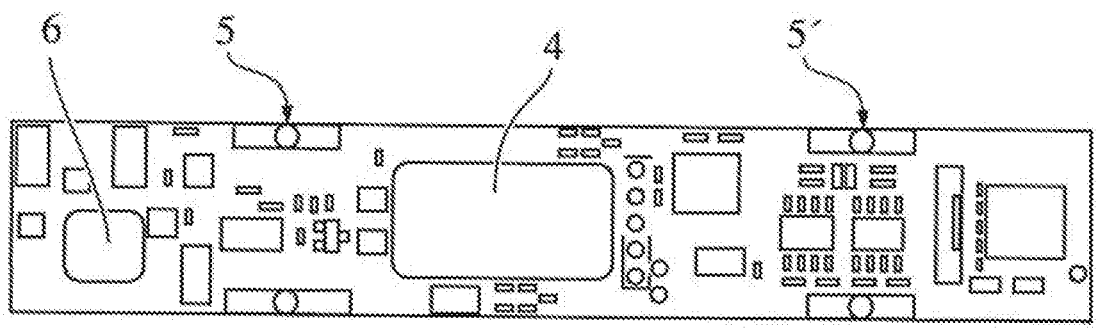
FIG. 7 is a schematic cross-sectional view of a circuit board of a rolling element according to the disclosure.

FIG. 7 shows a circuit board 8 of a rolling element 1 according to an exemplary embodiment of the present invention. For reasons of clarity, not all the elements are shown in this case. In the center, the point which is provided for attaching the micro-generator 4 is visible. On both sides of said point and on both edges of the circuit board 8, attachment points can be seen, which are used to attach two capacitive sensors 5, 5'. These two sensors 5, 5' which are at a distance from one another along the centerline allow a measurement relative to one another and thus, in addition to a pure force measurement along three axes, also allow the measurement of a tipping of the rolling element 1, that is to say a deformation of the rolling element 1 which has different strengths along the centerline. Furthermore, a radio module 6 is shown merely by way of example. The circuit board 8 is dimensioned in such a way that it fits into the bore hole 3 and preferably comprises a small lateral tolerance.

Figure 8:
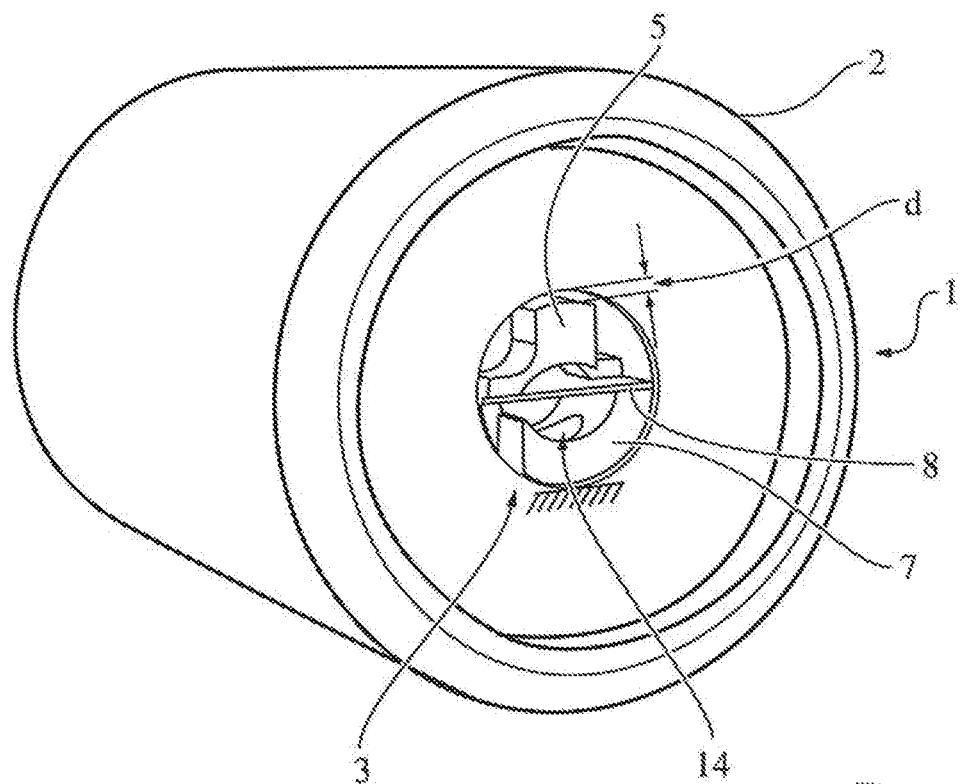
FIG. 8 is a schematic perspective view of a rolling element according to the disclosure.

FIG. 8 is a schematic perspective view of a rolling element 1 according to an exemplary embodiment of the present invention. In this case, the embodiment shown substantially corresponds to the embodiments shown in the previous drawings, and therefore reference is made generally to the comments in this regard. In particular, the circuit board 8 inserted in the bore hole 3 comprising the sensor 5 and the means 7 can be seen well here.

Figure 9:
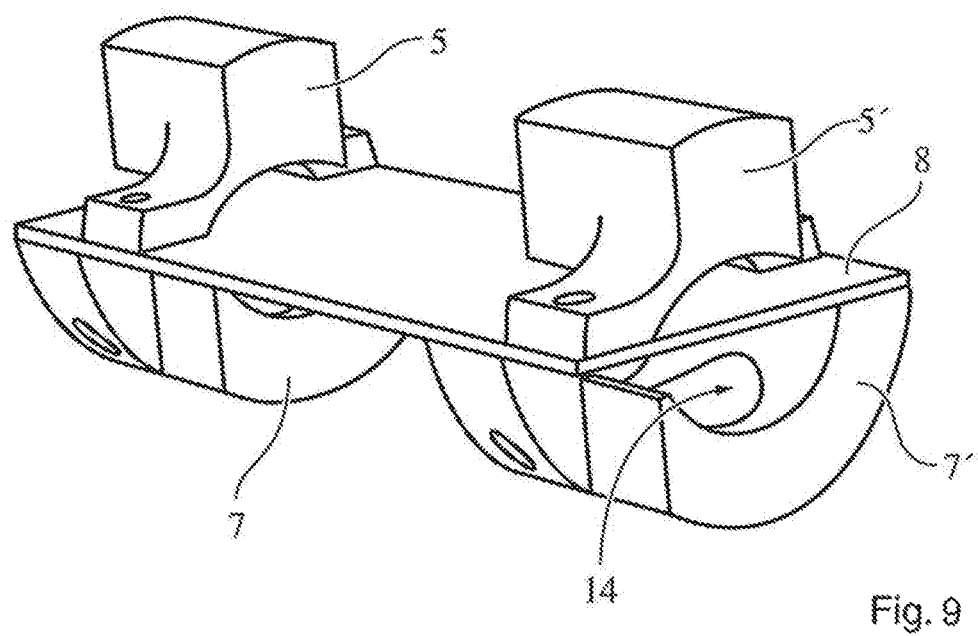
FIG. 9 is a schematic perspective view of a circuit board of a rolling element according to the disclosure.

FIG. 9 is a schematic perspective view of a circuit board 8 of a rolling element 1 according to an exemplary embodiment of the present invention. In this case, the embodiment shown substantially corresponds to the embodiment shown in FIG. 7, and therefore reference is made generally to the comments in this regard. Two capacitive sensors 5, 5' and accordingly two means 7, 7' in the form of rolling contact blocks are also provided here. In addition, it can clearly be seen where the magnet 14 is inserted in the means 7, this being merely an example of an attachment option.

Figure 10:
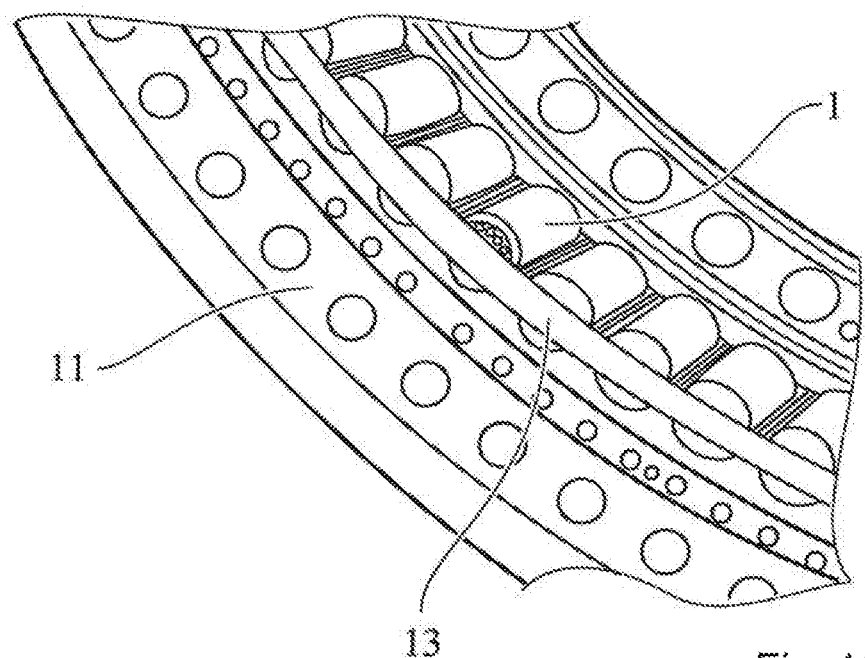
FIG. 10 is a perspective view of a rolling-element bearing according to the disclosure.

FIG. 10 is a perspective view of a rolling-element bearing according to an exemplary embodiment of the present invention. In this case, said rolling-element bearing is a large rolling-element bearing comprising an outer ring 11, an inner ring 12 (not shown here for reasons of clarity) and a cage 13 which is arranged therebetween which has a plurality of rolling elements and keeps said elements at a uniform distance from one another. At least one rolling element in this case is a rolling element 1 within the meaning of this application, that is to say a measuring roller.

Figure 11:
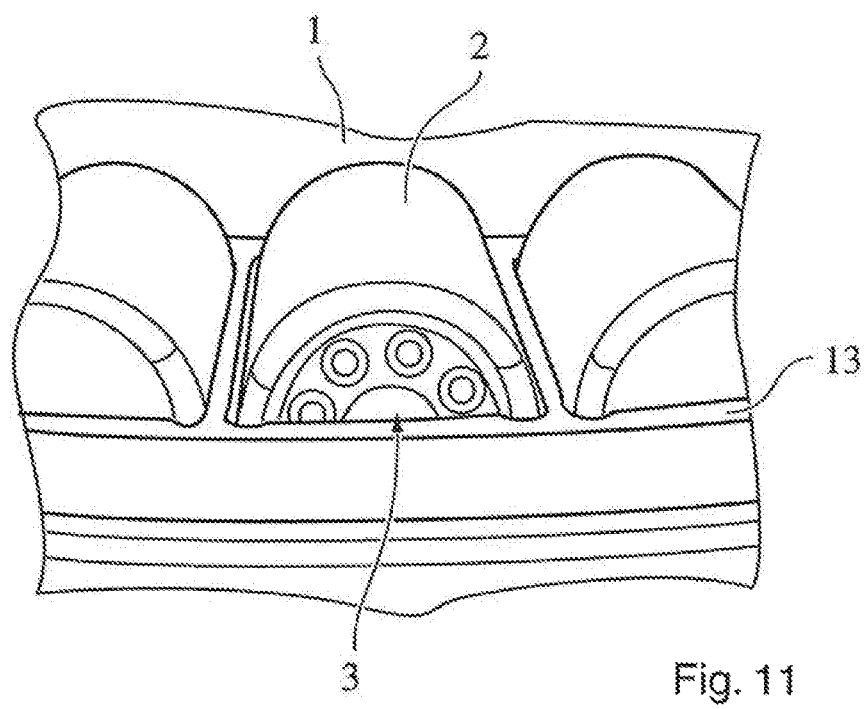
FIG. 11 is a perspective detailed view of a rolling-element bearing according to the disclosure.

FIG. 11 is a perspective detailed view of a rolling-element bearing according to an exemplary embodiment of the present invention. In particular, a rolling element 1 according to the invention is shown here, in addition to two conventional rolling elements. As can be seen from the drawing, the rolling element 1 has no wiring, said element functions autonomously and transmits the measured data wirelessly, and therefore the rolling-element bearing can be surrounded for example by a housing, and a load measurement is still possible. As a result, the large rolling-element bearing can be installed for example in a wind turbine and transmit load measurement data to a control unit so that a need for maintenance can be detected in good time and without complex interventions in the rolling-element bearing.

LIST OF REFERENCE NUMERALS 1 rolling element
2 outer casing 3 bore hole
4 micro-generator
5, 5' sensor
6 radio module
7, 7' means for producing a defined distance from the bore wall
8 circuit board
9 strain gage
10 coils
11 outer ring
12 inner ring
13 cage
14 magnet
15 cage magnets
16 means for determining position
d deformation

What is claimed is:

1. A rolling element for use in a rolling-element bearing, comprising:
    an outer casing and a bore hole, the bore hole having a bore wall arranged about a centerline of the rolling element;
    a sensor arranged in the bore hole, the sensor configured to measure load;
    a radio module configured to transmit data measured by the sensor;
    a micro-generator configured to provide the energy required for operation of the sensor and/or of the radio module, wherein the micro-generator is an inductive generator configured to interact with magnets that are disposed on a cage of the rolling-element bearing; and
    coils arranged on a circular path between the bore hole and the outer shell.

2. The rolling element of claim 1, wherein the sensor is a capacitive sensor configured to measure a distance between the sensor and the bore wall.

3. The rolling element of claim 1, wherein the sensor includes two sensors arranged along the centerline at a distance from one another, with the two sensors being disposed in the bore hole.

4. The rolling element of claim 1, including means for producing a defined distance from the bore wall, wherein the means for producing a defined distance is disposed axially at a level of the sensor.

5. The rolling element of claim 4, wherein the means for producing a defined distance from the bore wall is disposed opposite the sensor with respect to the centerline.

6. The rolling element of claim 4, including a circuit board arranged in the bore hole, wherein one or more of the radio module, the micro-generator, the sensor and the means for producing a defined distance is attached to the circuit board.

7. The rolling element of claim 1, wherein the radio module is provided to transmit the measured data in a frequency range of from 100 MHz to 6 GHz.

8. The rolling element of claim 1, wherein the radio module is provided to transmit the measured data at a frequency of 833 MHz.

9. The rolling element of claim 1, wherein the bore hole comprises a diameter of about 5 mm to about 50 mm, and/or the rolling element is cylindrical and comprises a length of about 90 mm to about 110 mm and a diameter from about 60 to about 70 mm.

10. The rolling element of claim 1, wherein the bore hole comprises a diameter of about 10 to about 30 mm, and/or the rolling element is cylindrical and comprises a length of about 104 mm and a diameter of about 65 mm.

11. The rolling element of claim 1, wherein the bore hole comprises a diameter of about 20 mm, and/or the rolling element is cylindrical and comprises a length of about 104 mm and a diameter of about 65 mm.

12. The rolling element of claim 1, comprising a strain gage arranged in an at least partially circumferential manner on the bore wall in the radial direction.

13. The rolling element of claim 1, wherein the rolling element has a means for determining position.

14. A rolling-element bearing, comprising:
    a first bearing ring;
    a second bearing ring which is rotatable about an axis of rotation and is arranged concentrically with the first bearing ring; and
    a plurality of rolling elements arranged between the first bearing ring and the second bearing ring, wherein each of the plurality of rolling elements are constructed according to the rolling element of claim 1.

15. A rolling element for use in a rolling-element bearing, comprising:
    an outer casing and a bore hole, the bore hole having a bore wall arranged about a centerline of the rolling element;
    a sensor arranged in the bore hole, the sensor configured to measure load;
    a radio module configured to transmit data measured by the sensor;
    a micro-generator configured to provide the energy required for operation of the sensor and/or of the radio module; and
    means for producing a defined distance from the bore wall, wherein the means for producing a defined distance is disposed axially at a level of the sensor, wherein the means for producing a defined distance from the bore wall includes a magnet.

* * * * *